United States Patent

Ohmura et al.

(10) Patent No.: US 9,889,830 B2
(45) Date of Patent: Feb. 13, 2018

(54) VEHICLE BRAKING SYSTEM

(71) Applicant: HONDA MOTOR CO., LTD., Minato-Ku, Tokyo (JP)

(72) Inventors: Kazutaka Ohmura, Wako (JP); Takeshi Kojima, Wako (JP); Tomoyuki Futamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 14/565,761

(22) Filed: Dec. 10, 2014

(65) Prior Publication Data

US 2015/0158472 A1 Jun. 11, 2015

(30) Foreign Application Priority Data

Dec. 11, 2013 (JP) .................. 2013-255688

(51) Int. Cl.
   *B60T 8/1755* (2006.01)

(52) U.S. Cl.
   CPC ........ *B60T 8/17554* (2013.01); *B60T 8/1755* (2013.01); *B60T 8/17551* (2013.01); *B60T 2201/122* (2013.01)

(58) Field of Classification Search
   CPC ...... B60L 7/26; B60T 8/1755; B60T 8/17551; B60T 8/17552; B60T 8/17554; B60T 8/17555; B60T 13/686; B60T 7/042
   See application file for complete search history.

(56) References Cited

U.S. PATENT DOCUMENTS

| 5,299,658 | A * | 4/1994 | Cox ................. B66F 7/20 187/209 |
| 6,216,079 | B1 * | 4/2001 | Matsuda ............. B60T 8/1755 701/48 |
| 6,315,371 | B1 * | 11/2001 | Wachi ................ B60T 7/042 303/11 |
| 6,322,164 | B1 * | 11/2001 | Sakamoto ......... B60T 8/3275 303/114.3 |
| 6,364,436 | B1 * | 4/2002 | Sawada ............. B60T 7/042 188/353 |
| 8,840,199 | B2 * | 9/2014 | Hatano .............. B60T 8/4081 303/113.1 |
| 2002/0033639 | A1 * | 3/2002 | Mizutani ........... B60T 7/042 303/113.1 |

(Continued)

FOREIGN PATENT DOCUMENTS

| EP | EP 1103436 A2 * | 5/2001 | ............. B60T 7/042 |
| JP | 2005-153716 A | 6/2005 | |

(Continued)

*Primary Examiner* — John Olszewski
*Assistant Examiner* — Thomas E Worden
(74) *Attorney, Agent, or Firm* — Carrier Blackman & Associates, P.C.; William D. Blackman; Joseph P. Carrier

(57) ABSTRACT

In a vehicle braking system for stabilizing vehicle behavior: a motor control unit determines whether or not the motor control unit receives a drive forbid signal from a yaw-moment control unit, when the motor control unit receives a drive instruction signal from a vehicle-behavior stabilization control unit. The motor control unit receives the drive forbid signal when the yaw-moment control unit performs yaw-moment control. The motor control unit forbids pre-pressurization using a slave cylinder, when the motor control unit receives the drive forbid signal.

4 Claims, 5 Drawing Sheets

(56) References Cited

U.S. PATENT DOCUMENTS

| | | | | |
|---|---|---|---|---|
| 2003/0218378 A1* | 11/2003 | Tanaka | ............ | B60T 8/1755 303/146 |
| 2004/0108771 A1* | 6/2004 | Tsunehara | ............ | B60L 7/22 303/155 |
| 2005/0269875 A1* | 12/2005 | Maki | ............ | B60L 7/26 303/152 |
| 2007/0001508 A1* | 1/2007 | Schluter | ............ | B60T 7/042 303/114.3 |
| 2007/0284936 A1* | 12/2007 | Maki | ............ | B60K 6/445 303/15 |
| 2008/0236959 A1* | 10/2008 | Hashida | ............ | B60T 8/4077 188/72.2 |
| 2009/0115244 A1* | 5/2009 | Schluter | ............ | B60T 8/4077 303/114.1 |
| 2010/0036577 A1* | 2/2010 | Kodama | ............ | B60L 7/26 701/76 |
| 2010/0117445 A1* | 5/2010 | Kato | ............ | B60T 7/042 303/11 |
| 2010/0161191 A1* | 6/2010 | Kato | ............ | B60T 8/442 701/70 |
| 2011/0278113 A1* | 11/2011 | Nishimura | ............ | B60T 8/4045 188/106 P |
| 2012/0109482 A1* | 5/2012 | Yoshii | ............ | B60T 7/042 701/70 |
| 2012/0161506 A1* | 6/2012 | Tanaka | ............ | B60T 13/745 303/14 |
| 2012/0190500 A1* | 7/2012 | Yamada | ............ | B60T 8/3275 477/184 |
| 2012/0256477 A1* | 10/2012 | Miyazaki | ............ | B60T 8/4081 303/6.01 |
| 2012/0283926 A1* | 11/2012 | Ito | ............ | B60T 8/4018 701/70 |
| 2012/0313427 A1* | 12/2012 | Nishioka | ............ | B60T 7/042 303/10 |
| 2013/0020858 A1* | 1/2013 | Maki | ............ | B60K 6/445 303/3 |
| 2013/0020859 A1* | 1/2013 | Maki | ............ | B60K 6/445 303/3 |
| 2013/0106170 A1* | 5/2013 | Baek | ............ | B60T 13/166 303/11 |
| 2013/0134768 A1* | 5/2013 | Ito | ............ | B60L 3/0092 303/3 |
| 2013/0234500 A1* | 9/2013 | Morishita | ............ | B60T 1/10 303/3 |
| 2013/0289845 A1* | 10/2013 | Ajiro | ............ | B60T 7/042 701/70 |
| 2014/0319903 A1* | 10/2014 | Murayama | ............ | B60T 8/368 303/15 |
| 2016/0090070 A1* | 3/2016 | Tagata | ............ | B60T 7/042 60/533 |

FOREIGN PATENT DOCUMENTS

| | | | |
|---|---|---|---|
| JP | 2007230419 A | * | 9/2007 |
| JP | 2008105523 A | * | 5/2008 |
| JP | 2009-227023 A | | 10/2009 |
| JP | 2009279966 A | * | 12/2009 |

* cited by examiner

VEHICLE BRAKING SYSTEM

CROSS REFERENCE TO RELATED APPLICATION

This application claims the foreign priority benefit under Title 35, United States Code, § 119(a)-(d) of Japanese Patent Application No. 2013-255688, filed on Dec. 11, 2013 in the Japan Patent Office, the disclosure of which is herein incorporated by reference in its entirety.

BACKGROUND OF THE INVENTION

Field of the Invention

The present invention relates to a vehicle braking system.

Description of the Related Art

Japanese Patent Laid-open No. 2009-227023 (which is hereinafter referred to as JP2009-227023A) discloses the following technique. According to the disclosed technique, at the start of operation of a yaw-moment control device, a slave cylinder is temporarily operated, a brake pressure generated in the slave cylinder is added to a brake pressure generated by the yaw-moment control device, and the sum of the brake pressures is outputted to wheel cylinders. The object of the above technique is to supplement deficiency in the initial responsiveness of the brake pressure generated by the yaw-moment control device with the initial responsiveness of the brake pressure in the slave cylinder and generate a brake pressure having high initial responsiveness.

In addition, according to the technique disclosed in Japanese Patent Laid-open No. 2005-153716 (which is hereinafter referred to as JP2005-153716A), the yaw moment of a vehicle is feedforward controlled and feedback controlled according to the steering angle and the like of the vehicle.

The technique disclosed in JP2009-227023A is intended to improve the initial responsiveness of the yaw-moment control by operating the slave cylinder in an initial stage of the yaw-moment control and increasing the hydraulic brake pressure.

However, in the case where the slave cylinder is operated as above at the start of the yaw-moment control in which braking force begins to be applied in advance of occurrence of a disturbance in the vehicle behavior by feedforward control or the like, the accuracy of the yaw-moment control is lowered. (See JP2005-153716A and the like for the yaw-moment control as above.) That is, in the yaw-moment control as disclosed in JP2005-153716A and the like, the yaw moment control is performed by generating a relatively small braking force. Therefore, when the braking force generated in the slave cylinder is added to the small braking force as above, it is difficult to accurately control the brake pressure to be equal to a target brake pressure.

SUMMARY OF INVENTION

An aspect of the present invention is to provide a vehicle braking system which can finely control the braking force for stabilizing the vehicle behavior.

An aspect of the present invention provides a vehicle braking system including: a hydraulic-pressure generation device which communicates with a master cylinder and generates a braking force with hydraulic pressure by an electrical actuator; a vehicle-behavior stabilization device which communicates with the hydraulic-pressure generation device and generates a braking force for stabilizing vehicle behavior; a first vehicle-behavior stabilization control unit which performs control for stabilizing the vehicle behavior by controlling the vehicle-behavior stabilization device; a hydraulic-pressure generation control unit which controls the hydraulic-pressure generation device so as to generate a predetermined hydraulic pressure during the control for stabilizing the vehicle behavior performed by the first vehicle-behavior stabilization control unit; and a second vehicle-behavior stabilization control unit which performs control for stabilizing the vehicle behavior by generating a braking force lower than the braking force generated by the vehicle-behavior stabilization device under the control of the first vehicle-behavior stabilization control unit. The hydraulic-pressure generation control unit forbids generation of the predetermined hydraulic pressure by the hydraulic-pressure generation device or reduces the predetermined hydraulic pressure during the control for stabilizing the vehicle behavior performed by the second vehicle-behavior stabilization control unit.

According to the present invention, during the control for stabilizing the vehicle behavior performed by the second vehicle-behavior stabilization control unit, the generation of the predetermined hydraulic pressure by the hydraulic-pressure generation device under control of the first vehicle-behavior stabilization control unit may be forbidden, or the hydraulic pressure generated by the hydraulic-pressure generation device may be reduced. Therefore, the control of the braking force for stabilizing the vehicle behavior can be finely performed by the second vehicle-behavior stabilization control unit.

Further, during the control for stabilizing the vehicle behavior performed by the second vehicle-behavior stabilization control unit, the hydraulic-pressure generation control unit may bring to zero the predetermined hydraulic pressure generated by the hydraulic-pressure generation device.

According to the present invention with the above feature, since the hydraulic-pressure generation control unit brings to zero the predetermined hydraulic pressure generated by the hydraulic-pressure generation device, the control of the braking force for stabilizing the vehicle behavior can be finely performed by the second vehicle-behavior stabilization control unit.

According to the present invention, it is possible to provide a vehicle braking system which can finely control the braking force for stabilizing the vehicle behavior.

BRIEF DESCRIPTION OF THE DRAWINGS

The object and features of the present invention will become more readily apparent from the following detailed description taken in conjunction with the accompanying drawings as follows.

DETAILED DESCRIPTION OF THE INVENTION

Hereinbelow, an embodiment of the present invention is explained below.

Figure 1:
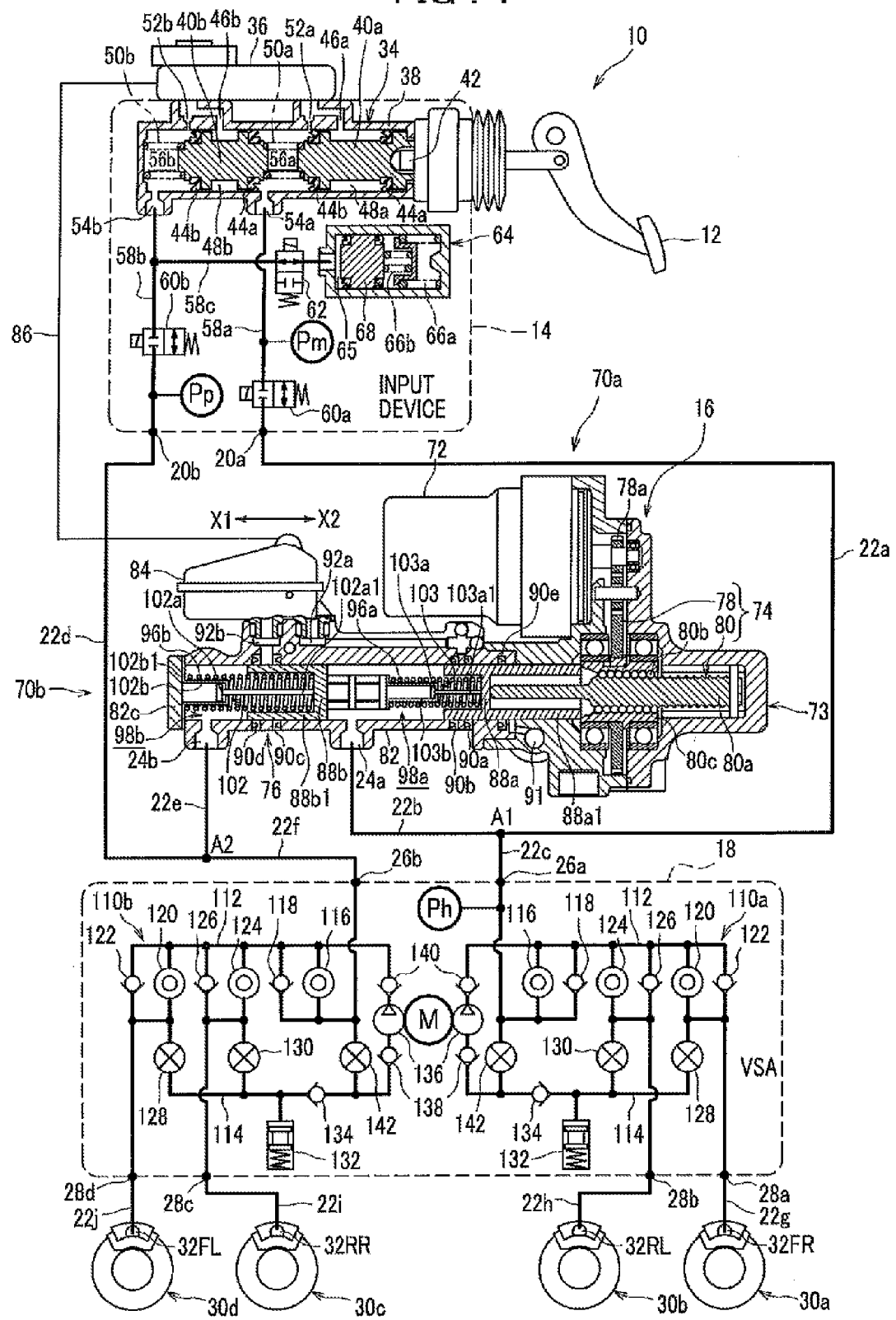
FIG. 1 is a schematic diagram illustrating the configuration of a vehicle braking system as an embodiment of the present invention.

FIG. 1 is a schematic diagram illustrating the configuration of a vehicle braking system 10. The vehicle braking system 10 is mounted on a vehicle (specifically, the vehicle 300, which is explained later). First, the hydraulic paths are explained. A connection port 20a of an input apparatus 14 is connected to a connection point A1 (which is indicated in FIG. 1 and regarded as a reference point) through a first piping tube 22a, an outlet port 24a of a slave cylinder 16 (as a hydraulic-pressure generation device) is connected to the connection point A1 through a second piping tube 22b, and an inlet port 26a of a vehicle-behavior stabilization device 18 is connected to the connection point A1 through a third piping tube 22c.

In addition, another connection port 20b of the input apparatus 14 is connected to another connection point A2 (which is regarded as another reference point) through a fourth piping tube 22d, another outlet port 24b of the slave cylinder 16 is connected to the connection point A2 through a fifth piping tube 22e, and another inlet port 26b of the vehicle-behavior stabilization device 18 is connected to the connection point A2 through a sixth piping tube 22f.

The vehicle-behavior stabilization device 18 has a plurality of outlet ports 28a to 28d. The first outlet port 28a is connected through a seventh piping tube 22g to a wheel cylinder 32FR in a disk brake mechanism 30a arranged in the right front wheel (not shown). The second outlet port 28b is connected through an eighth piping tube 22h to a wheel cylinder 32RL in a disk brake mechanism 30b arranged in the left rear wheel (not shown). The third outlet port 28c is connected through a ninth piping tube 22i to a wheel cylinder 32RR in a disk brake mechanism 30c arranged in the right rear wheel (not shown). The fourth outlet port 28d is connected through a tenth piping tube 22j to a wheel cylinder 32FL in a disk brake mechanism 30d arranged in the left front wheel (not shown).

In the above arrangement, the brake fluid is fed to the wheel cylinders 32FR, 32RL, 32RR, and 32FL in the disk brake mechanisms 30a to 30d through the piping tubes 22g to 22j connected to the outlet ports 28a to 28d, respectively. Therefore, when the hydraulic pressure in the wheel cylinders 32FR, 32RL, 32RR, and 32FL rises, the wheel cylinders 32FR, 32RL, 32RR, and 32FL operate and exert frictional braking force on the respectively corresponding wheels (i.e., the right front wheel, the left rear wheel, the right rear wheel, and the left front wheel).

The input apparatus 14 includes a master cylinder 34 and a first reservoir 36 which is attached to the master cylinder 34. The master cylinder 34 is a tandem type, and can generate hydraulic pressure in response to manipulation of the brake pedal 12 by the driver. In a cylinder tube 38 of the master cylinder 34, a second piston 40a and a first piston 40b are arranged apart from each other by a predetermined distance in the axial direction of the cylinder tube 38 so as to be slidable along the axial direction of the cylinder tube 38. The second piston 40a is arranged close to the brake pedal 12, and connected to the brake pedal 12 through a pushrod 42. The first piston 40b is arranged farther from the brake pedal 12 than the second piston 40a.

A pair of cup seals 44a and 44b are fitted on the outer circumferential surface of each of the second piston 40a and the first piston 40b via annular step portions, respectively. In addition, back chambers 48a and 48b are formed between the cup seals 44a and 44b in the pairs, respectively. The back chambers 48a and 48b respectively communicate with supply ports 46a and 46b, which are explained later. Further, a spring member 50a is arranged between the second piston 40a and the first piston 40b, and another spring member 50b is arranged between the first piston 40b and a front end portion of the cylinder tube 38.

Moreover, the two supply ports 46a and 46b, two relief ports 52a and 52b, and two output ports 54a and 54b are arranged in the cylinder tube 38 in the master cylinder 34. In this case, the supply port 46a and 46b and the relief ports 52a and 52b are arranged such that the supply port 46a and the relief port 52a join and the supply port 46b and the relief port 52b join, so that the supply ports 46a and 46b and the relief ports 52a and 52b communicate with a reservoir chamber (not shown) in the first reservoir 36.

Further, a second pressure chamber 56a and a first pressure chamber 56b are arranged in the cylinder tube 38 in the master cylinder 34. Hydraulic pressure corresponding to the tread force with which the brake pedal 12 is depressed by the driver is generated in the first and second pressure chambers 56b and 56a. The second pressure chamber 56a is arranged to communicate with the connection port 20a through a second hydraulic path 58a. The first pressure chamber 56b is arranged to communicate with the other connection port 20b through a first hydraulic path 58b.

In addition, a pressure sensor Pm is arranged on the upstream side of the second hydraulic path 58a between the master cylinder 34 and the connection port 20a, and a second shutoff valve 60a realized by a normally-open solenoid valve is arranged on the downstream side of the second hydraulic path 58a. The pressure sensor Pm measures the hydraulic pressure on the master cylinder 34 side (i.e., on the upstream side) of the second shutoff valve 60a in the second hydraulic path 58a.

Further, a first shutoff valve 60b realized by a normally-open solenoid valve is arranged on the upstream side of the first hydraulic path 58b between the master cylinder 34 and the connection port 20b, and a pressure sensor Pp is arranged on the downstream side of the first hydraulic path 58b. The pressure sensor Pp detects the hydraulic pressure on the wheel cylinders 32FR, 32RL, 32RR, and 32FL side (i.e., on the downstream side) of the first shutoff valve 60b in the first hydraulic path 58b.

The normally-open solenoid valves realizing the first and second shutoff valves 60b and 60a are valves configured such that the normal position (the position of the valve element during demagnetization (while being unenergized)) is (normally) the valve-open state. In the state illustrated in FIG. 1, the second shutoff valve 60a and the first shutoff valve 60b (and a third shutoff valve 62, which is explained later) are energized.

Further, a hydraulic branch path 58c, which branches off from the first hydraulic path 58b, is arranged in the first hydraulic path 58b between the master cylinder 34 and the first shutoff valve 60b, and the third shutoff valve 62 and a stroke simulator 64 are connected in series to the hydraulic branch path 58c. The third shutoff valve 62 is realized by a normally-closed solenoid valve. The normally-closed solenoid valve realizing the third shutoff valve 62 is a valve configured such that the normal position (the position of the valve element during demagnetization (while being unenergized)) is (normally) the valve-closed state.

The stroke simulator 64 is arranged on the master cylinder 34 side of the first shutoff valve 60b in the first hydraulic path 58b. A hydraulic chamber 65, which communicates with the hydraulic branch path 58c, is arranged in the stroke simulator 64 such that the stroke simulator 64 can absorb, through the hydraulic chamber 65, the brake fluid delivered from the first pressure chamber 56b in the master cylinder 34.

In addition, the stroke simulator 64 includes first and second return springs 66a and 66b and a simulator piston 68. The first and second return springs 66a and 66b are arranged in series, and the simulator piston 68 is biased by the first and second return springs 66a and 66b. The spring constant of the first return spring 66a is great, and the spring constant of the second return spring 66b is small. The first and second return springs 66a and 66b and the simulator piston 68 are arranged in such a manner that the increase rate of the pedal reaction force is low in the early stage (the first half) of depression of the brake pedal 12, and the pedal reaction force becomes strong in the late stage (the second half) of the depression of the brake pedal 12, and the driver feels a pedal feeling equivalent to the pedal feeling with the conventional master cylinder.

The hydraulic paths can be roughly divided into a second hydraulic route 70a and a first hydraulic route 70b. The second hydraulic route 70a connects the second pressure chamber 56a in the master cylinder 34 to the wheel cylinders 32FR and 32RL, and the first hydraulic route 70b connects the first pressure chamber 56b in the master cylinder 34 to the wheel cylinders 32RR and 32FL.

The second hydraulic route 70a is constituted by the second hydraulic path 58a and the piping tubes 22a, 22b, 22c, 22g, and 22h. The second hydraulic path 58a connects the connection port 20a in the input apparatus 14 and the outlet port 54a of the master cylinder 34 (the cylinder tube 38) in the input apparatus 14. The piping tubes 22a and 22b connect the connection port 20a of the input apparatus 14 and the outlet port 24a of the slave cylinder 16, and the piping tubes 22b and 22c connect the outlet port 24a of the slave cylinder 16 and the inlet port 26a of the vehicle-behavior stabilization device 18. The piping tubes 22g and 22h connect the outlet ports 28a and 28b of the vehicle-behavior stabilization device 18 and the wheel cylinders 32FR and 32RL, respectively.

The first hydraulic route 70b is constituted by the first hydraulic path 58b and the piping tubes 22d, 22e, 22f, 22i, and 22j. The first hydraulic path 58b connects the outlet port 54b of the master cylinder 34 (the cylinder tube 38) and the connection port 20b in the input apparatus 14. The piping tubes 22d and 22e connect the connection port 20b of the input apparatus 14 and the outlet port 24b of the slave cylinder 16. The piping tubes 22e and 22f connect the outlet port 24b of the slave cylinder 16 and the inlet port 26b of the vehicle-behavior stabilization device 18. The piping tubes 22i and 22j connect the outlet ports 28c and 28d of the vehicle-behavior stabilization device 18 and the wheel cylinders 32RR and 32FL, respectively.

The slave cylinder 16 is an electric brake device which generates hydraulic brake pressure by driving a second slave piston 88a and a first slave piston 88b in the axial direction with the driving force of an electric motor (electric actuator) 72. In the following explanations, the direction of movement of the second slave piston 88a and the first slave piston 88b in the slave cylinder 16 (the direction of the arrow X1 in FIG. 1) when the hydraulic brake pressure is generated (or raised) in the slave cylinder 16 is referred to as "front", and the opposite direction (the direction of the arrow X2 in FIG. 1) is referred to as "rear".

The slave cylinder 16 includes a cylinder portion 76, the motor 72, and a driving-force transmission portion 73. The second slave piston 88a and the first slave piston 88b, which can be moved in the axial direction, are installed in the cylinder portion 76. The motor 72 is provided for driving the second slave piston 88a and the first slave piston 88b. The driving-force transmission portion 73 is provided for transmitting the driving force of the motor 72 to the second slave piston 88a and the first slave piston 88b.

In addition, a second cylindrical member 88a1 extending forward and backward from the second slave piston 88a is fixed to the outer circumference of the second slave piston 88a such that the second cylindrical member 88a1 and the second slave piston 88a are integrally formed. Further, a first cylindrical member 88b1 extending forward and backward from the first slave piston 88b is fixed to the outer circumference of the first slave piston 88b such that the first cylindrical member 88b1 and the first slave piston 88b are integrally formed. Since the first cylindrical member 88b1 slides inside the cylinder portion 76 in contact with the cylinder portion 76, the first slave piston 88b can be driven back and forth.

The driving-force transmission portion 73 includes a driving-force transmission mechanism 74 having a gear mechanism (deceleration mechanism) 78 and a ball-screw structure 80. The gear mechanism 78 transmits the rotational driving force of the motor 72, and the ball-screw structure 80 converts the rotational driving force to linear driving force in a ball-screw shaft (screw) 80a.

The cylinder portion 76 includes a cylinder body 82 and a second reservoir 84. The cylinder body 82 has an approximately cylindrical shape, and the second reservoir 84 is attached to the cylinder body 82. The second reservoir 84 is arranged to be connected through a piping tube 86 to the first reservoir 36 (which is attached to the master cylinder 34 in the input apparatus 14) such that the brake fluid reserved in the first reservoir 36 is fed to the second reservoir 84 through the piping tube 86.

As explained before, in the cylinder body 82, the second slave piston 88a and a first slave piston 88b are drivably arranged in such a manner that the first and second slave pistons 88b and 88a are a predetermined distance apart from each other along the direction of the axis of the cylinder body 82. The second slave piston 88a is arranged close to the ball-screw structure 80 in contact with a front end portion of the ball-screw shaft 80a, and displaced together with the ball-screw shaft 80a in the direction indicated by the arrows X1 and X2. The first slave piston 88b is arranged more apart from the ball-screw structure 80 than the second slave piston 88a.

A slave cup seal 90a (as a seal member) is arranged on the cylinder portion 76 side. The slave cup seal 90a liquid-tightly seals between the outer circumferential surface of the second cylindrical member 88a1 (fixed to the second slave piston 88a) and the driving-force transmission mechanism 74. In addition, a slave cup seal 90b (as a seal member) is also arranged on the cylinder portion 76 side at a position apart from the slave cup seal 90a, and a flow path opening which communicates with a reservoir port 92a (which is explained later) is arranged between the slave cup seal 90a and the slave cup seal 90b. Further, a second return spring 96a is arranged between the second slave piston 88a and the first slave piston 88b. Furthermore, a slave cup seal 90e (as a seal member) and a liquid pit 91 are arranged on the cylinder portion 76 side. The slave cup seal 90e and the liquid pit 91 are located on the side, opposite to the slave cup seal 90b, of the slave cup seal 90a. The provision of the slave cup seal 90e and the liquid pit 91 enables improvement in the liquid tightness of the sealing.

Moreover, a slave cup seal 90c (as a seal member) is arranged on the cylinder portion 76 side. The slave cup seal 90c liquid-tightly seals between the outer circumferential surface of the second cylindrical member 88b1 (fixed to the first slave piston 88b) and the first hydraulic chamber 98b (which is explained later). The slave cup seal 90b and the guide piston 90c liquid-tightly seal the second hydraulic chamber 98a (which is explained later).

In addition, a slave cup seal 90d (as a seal member) is arranged on the cylinder portion 76 side. The slave cup seal 90d is located at a position apart from the slave cup seal 90c, and liquid-tightly seals the first hydraulic chamber 98b. Further, a flow path opening which communicates with the reservoir port 92b (explained later) is arranged between the guide piston 90c and the slave cup seal 90d. Furthermore, a first return spring 96b is arranged between the first slave piston 88b and a lid member 82c, which closes the opening of the cylinder body 82 (i.e., the opening arranged at the front end of the cylinder portion 76).

The two reservoir ports 92a and 92b and the two outlet ports 24a and 24b are arranged in the cylinder body 82 in the cylinder portion 76. In this case, the reservoir ports 92a and 92b are arranged to communicate with a reservoir chamber in the second reservoir 84.

In addition, the second hydraulic chamber 98a and the first hydraulic chamber 98a are arranged in the cylinder body 82. The second hydraulic chamber 98a controls the hydraulic brake pressure outputted from the outlet port 24a to the wheel cylinders 32FR and 32RL, and the first hydraulic chamber 98b generates the hydraulic brake pressure outputted from the outlet port 24b to sides of the wheel cylinders 32RR and 32FL.

In addition, a restriction means 102 which restricts the stroke range of the first slave piston 88b is arranged between the first slave piston 88b and the lid member 82c, which closes the opening of the cylinder portion 76. Therefore, overreturn of the first slave piston 88b to the second slave piston 88a side is prevented. In particular, during the backup operation in which braking is effected by the brake pressure generated by the master cylinder 34, it is possible to prevent occurrence of a failure in one of the hydraulic routes even when the other of the hydraulic routes fails. Further, a restriction means 103 which restricts the maximum distance and the minimum distance between the first slave piston 88b and the second slave piston 88a is arranged between the first slave piston 88b and the second slave piston 88a.

The restriction means 102 is constituted by a cylindrical member 102b and a first restriction piston 102a. The cylindrical member 102b is fixed through a flange portion 102b1 between the cylinder body 82 and the lid member 82c, and the first restriction piston 102a is connected with the first slave piston 88b by a connection member 102a1 and slides inside the cylindrical member 102b. Specifically, the flange portion 102b1 constituting the restriction means 102 is sandwiched between the cylinder body 82 (i.e., the cylinder portion 76) and the lid member 82c, and fixed by screw fastening or the like (not shown). Since the first restriction piston 102a slides inside the cylindrical member 102b, the stroke range of the first slave piston 88b, which is connected to the first restriction piston 102a, is restricted.

The restriction means 103 is constituted by a cylindrical member 103b and a second restriction piston 103a. The cylindrical member 103b is connected and fixed to the first slave piston 88b, and the second restriction piston 103a is connected with the second slave piston 88a by a connection member 103a1 and slides inside the cylindrical member 103b. Since the second restriction piston 103a slides inside the cylindrical member 103b in contact with the cylindrical member 103b, the stroke range of the second slave piston 88a, which is connected to the second restriction piston 103a, is restricted.

The vehicle-behavior stabilization device 18 includes first and second brake systems 110b and 110a. The second brake system 110a controls the second hydraulic route 70a connected to the disk brake mechanisms 30a and 30b (in the wheel cylinders 32FR and 32RL) in the right front wheel and the left rear wheel, and the first brake system 110b controls the first hydraulic route 70b connected to the disk brake mechanisms 30c and 30d (in the wheel cylinders 32RR and 32FL) in the right rear wheel and the left front wheel.

The combination of connections between the second and first brake systems 100a and 100b and the disk brake mechanisms 30a, 30b, 30c and 30d is not limited to the combination explained before. As long as two mutually independent routes are secured, the following combinations of connections may be used. That is, although not shown, the second brake system 110a may be constituted by hydraulic routes connected to the disk brake mechanisms arranged for the left front wheel 2aL and the right front wheel 2aR, and the first brake system 110b may be constituted by hydraulic routes connected to the disk brake mechanisms arranged for the left rear wheel and the right rear wheel. Alternatively, the second brake system 110a may be constituted by hydraulic routes connected to the disk brake mechanisms arranged for the right front wheel and the right rear wheel, and the first brake system 110b may be constituted by hydraulic routes connected to the disk brake mechanisms arranged for the left front wheel and the left rear wheel. Further alternatively, the second brake system 110a may be constituted by hydraulic routes connected to the disk brake mechanisms arranged for the right front wheel and the left front wheel, and the first brake system 110b may be constituted by hydraulic routes connected to the disk brake mechanisms arranged for the right rear wheel 2bR and the left rear wheel 2bL.

Since the second braking system 110b and the first braking system 110a have identical structures, identical reference numbers are assigned to equivalent elements in the first and second braking systems 110b and 110a in FIG. 1. The following explanations are focused on the second braking system 110a, and the explanations on the first braking system 110b are indicated in parentheses as appropriate.

The second braking system 110a (or the first braking system 110b) includes the first and second common hydraulic paths 112 and 114, which are common to the wheel cylinders 32FR and 32RL (or to the wheel cylinders 32RR and 32FL). The vehicle-behavior stabilization device 18 includes a regulator valve 16, first, second, and third check valves 118, 122, and 126, and first and second in-valves 120 and 124. The regulator valve 116 is realized by a normally-open solenoid valve, and arranged between the inlet port 26a and the first common hydraulic path 112. The first check valve 118 is arranged parallel with the above regulator valve 116, and allows flow of the brake fluid from the inlet port 26a side to the first common hydraulic path 112 side (and stops flow of the brake fluid from the first common hydraulic path 112 side to the inlet port 26a side). The first in-valve 120 is realized by a normally-open solenoid valve, and arranged between the first common hydraulic path 112 and the first outlet port 28*a*. The second check valve 122 is arranged parallel with the above first in-valve 120, and allows flow of the brake fluid from the first outlet port 28*a* side to the first common hydraulic path 112 side (and stops flow of the brake fluid from the first common hydraulic path 112 side to the first outlet port 28*a* side). The second in-valve 124 is realized by a normally-open solenoid valve, and arranged between the first common hydraulic path 112 and the second outlet port 28*b*. The third check valve 126 is arranged parallel with the above second in-valve 124, and allows flow of the brake fluid from the second outlet port 28*b* side to the first common hydraulic path 112 side (and stops flow of the brake fluid from the first common hydraulic path 112 side to the second outlet port 28*b* side).

Further, the vehicle-behavior stabilization device 18 includes first and second out-valves 128 and 130, a reservoir 132, a fourth check valve 134, a pump 136, suction valves 138 and 142, a discharge valve 140, and a motor M. The first out-valve 128 is realized by a normally-closed solenoid valve, and arranged between the first outlet port 28*a* and the second common hydraulic path 114. The second out-valve 130 is realized by a normally-closed solenoid valve, and arranged between the second outlet port 28*b* and the second common hydraulic path 114. The reservoir 132 is connected to the second common hydraulic path 114. The fourth check valve 134 is arranged between the first common hydraulic path 112 and the second common hydraulic path 114, and allows flow of the brake fluid from the second common hydraulic path 114 side to the first common hydraulic path 112 side (and stops flow of the brake fluid from the first common hydraulic path 112 side to the second common hydraulic path 114 side). The pump 136 is arranged between the fourth check valve 134 and the first common hydraulic path 112, and feeds the brake fluid from the second common hydraulic path 114 side to the first common hydraulic path 112 side. The suction valve 138 and the discharge valve 140 are respectively arranged on the front and rear sides of the pump 136. The motor M drives the pump 136. The suction valve 142 is realized by a normally-closed solenoid valve, and arranged between the second common hydraulic path 114 and the inlet port 26*a*.

Furthermore, a pressure sensor Ph is arranged on the hydraulic path close to the inlet port 26*a* in the second braking system 110*a*, and detects the pressure of the brake fluid which is delivered from the outlet port 24*a* of the slave cylinder 16 and generated in the second hydraulic pressure chamber 98*a* in the slave cylinder 16.

Next, operations of the vehicle braking system 10 are explained. While the vehicle braking system 10 normally operates, the second shutoff valve 60*a* and the first shutoff valve 60*b*, which are realized by normally-open solenoid valves, come into the valve-closed state by energization, and the third shutoff valve 62, which is realized by a normally-closed solenoid valve, comes into the valve-open state. (See FIG. 1.) Since the second hydraulic circuit 70*a* and the first hydraulic circuit 70*b* are shut off by the second shutoff valve 60*a* and the first shutoff valve 60*b*, the hydraulic brake pressure generated in the master cylinder 34 in the input apparatus 14 is not transmitted to the wheel cylinders 32FR, 32RL, 32RR, and 32FL in the disk brake mechanisms 30*a* to 30*d*.

At this time, the hydraulic brake pressure generated in the first pressure chamber 56*b* in the master cylinder 34 is transmitted to the hydraulic pressure chamber 65 in the stroke simulator 64 through the hydraulic branch path 58*c* and the third shutoff valve 62 (which is in the valve-open state). The hydraulic brake pressure transmitted to the hydraulic pressure chamber 65 causes the simulator piston 68 to move against the spring force produced by the first and second return springs 66*a* and 66*b*. Therefore, a stroke of the brake pedal 12 is allowed, and the hydraulic brake pressure in the hydraulic pressure chamber 65 generates dummy pedal reaction force, and imparts the dummy pedal reaction force to the brake pedal 12.

In the above system situation, when depression of the brake pedal 12 by the driver is detected by a brake-pedal sensor (not shown), the motor 72 in the slave cylinder 16 is driven, and the driving force of the motor 72 is transmitted through the driving-force transmission mechanism 74, so that the second slave piston 88*a* and the first slave piston 88*b* are displaced toward the direction of the arrow X1 against the spring force of the second return spring 96*a* and the first return spring 96*b*. The displacement of the second slave piston 88*a* and the first slave piston 88*b* makes the brake fluid in the second hydraulic chamber 98*a* and the first hydraulic chamber 98*b* pressed to be balanced and generate a desired hydraulic brake pressure.

The hydraulic brake pressure in the first hydraulic chamber 98*b* and the second hydraulic chamber 98*a* in the slave cylinder 16 is transmitted to the wheel cylinders 32FR, 32RL, 32RR, and 32FL in the disc brake mechanisms 30*a* to 30*d* through the first and second in-valves 120 and 124 in the vehicle-behavior stabilization device 18, which are in the valve-open state, so that the wheel cylinders 32FR, 32RL, 32RR, and 32FL are actuated and necessary frictional braking force is exerted on the respective wheels 2*a*R, 2*a*L, 2*b*R, and 2*b*L.

In other words, during normal operation of the vehicle braking system 10, in which the slave cylinder 16 (functioning as the electric brake device) and a control device (performing by-wire control and corresponding to the brake control unit 241 explained later) are operable, the connection between the disc brake mechanisms 30*a* to 30*d* (for the wheel cylinders 32FR, 32RL, 32RR, and 32FL) and the master cylinder 34 which generates a hydraulic brake pressure when the driver depresses the brake pedal 12 is shut off by the second shutoff valve 60*a* and the first shutoff valve 60*b*, and the hydraulic brake pressure generated by the slave cylinder 16 actuates the disc brake mechanisms 30*a* to 30*d*. That is, the so-called brake-by-wire brake system becomes active during normal operation of the vehicle braking system 10.

Next, the control performed by the vehicle-behavior stabilization device 18 is explained below.

Figure 2:
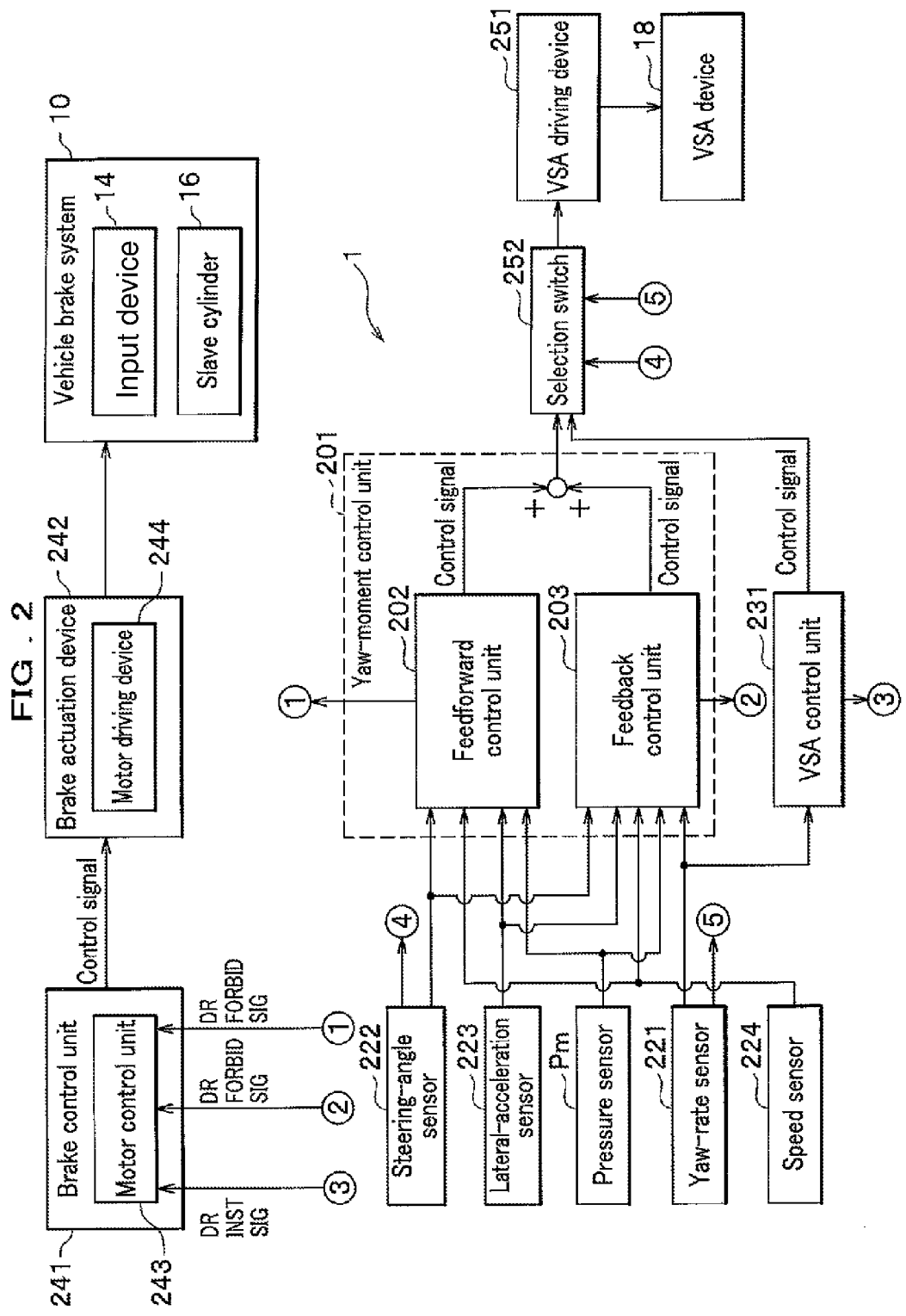
FIG. 2 is a block diagram illustrating electric connections in a brake control system in the vehicle braking system as the embodiment of the present invention.

FIG. 2 is a block diagram illustrating electric connections in a brake control system 1, which controls the vehicle braking system 10 as the embodiment of the present invention. The brake control system 1 includes a brake control unit 241, which controls generation of braking force in correspondence with a manipulation of the brake pedal 12 by the driver as mentioned before, by controlling the input apparatus 14, the slave cylinder 16, and the like. In addition, the brake control system 1 includes a vehicle-behavior stabilization control unit 231 (corresponding to the first vehicle-behavior stabilization control unit), which realizes control for stabilizing a predetermined type of vehicle behavior by controlling the vehicle-behavior stabilization device 18. Further, the brake control system 1 includes a yaw-moment control unit 201 (corresponding to the second vehicle-behavior stabilization control unit), which stabilizes the vehicle behavior by realizing a predetermined type of yaw-moment control in the vehicle by control of the vehicle-behavior stabilization device 18. Each of the yaw-moment control unit 201, the vehicle-behavior stabilization control unit 231, and the brake control unit 241 is a control device which is mainly constituted by a microcomputer. Although control for stabilization of the vehicle behavior is performed in both of the yaw-moment control unit 201 and the vehicle-behavior stabilization control unit 231, the differences in details of the control between the yaw-moment control unit 201 and the vehicle-behavior stabilization control unit 231 are explained later.

First, the brake control unit 241 realizes the aforementioned brake-by-wire type braking by controlling (the respective actuators in) the input apparatus 14, the slave cylinder 16, and the like. Specifically, the brake control unit 241 outputs various control signals to a brake actuation device 242, which actuates the vehicle braking system 10 (including the input apparatus 14, the slave cylinder 16, and the like), so that the brake actuation device 242 controls (the actuators, such as the motor 72, the aforementioned valves, and the like, in) the vehicle braking system 10 (including the input apparatus 14, the slave cylinder 16, and the like).

In particular, the brake control unit 241 includes a motor control unit 243. The motor control unit 243 controls the motor 72, which drives the slave cylinder 16. The brake actuation device 242 includes a motor driving device 244, which drives the motor 72. The motor 72 is, for example, a servo motor constituted by a brushless motor. The motor driving device 244 supplies three-phase alternating current to the motor 72, and receives a detection signal from a shunt resistor (not shown) provided for detection of the current and a detection signal from a Hall element (not shown) provided for detection of the position of the rotor in the motor 72.

The vehicle-behavior stabilization control unit 231 outputs control signals to a vehicle-behavior stabilization driving device 251 (through a selection switch 252) on the basis of a variety of predetermined physical quantities which are detected by various sensors (including, for example, the yaw rate of the vehicle detected by a yaw-rate sensor 221, which is provided for detecting the yaw rate of the vehicle). Thus, the vehicle-behavior stabilization driving device 251 controls (the aforementioned various actuators, such as the motor M which drives the pump 136, in) the vehicle-behavior stabilization device 18. The control performed by the vehicle-behavior stabilization control unit 231 includes, for example, the feedback control in which control is performed such that the actual yaw rate detected by the yaw-rate sensor 221 approaches a target yaw rate.

The vehicle-behavior stabilization control unit 231 performs the vehicle-behavior stabilization control, for example, for coping with a skid during travelling of the vehicle by applying braking force to each of the four wheels of the vehicle. That is, the vehicle-behavior stabilization control is a type of control, for example, for coping with the situation in which a sideslip of the rear portion of the vehicle is caused by abrupt steering during travelling of the vehicle. The vehicle-behavior stabilization control unit 231 can determine the situation in which the vehicle behavior becomes unstable as above, on the basis of the aforementioned detected physical quantities such as the yaw rate of the vehicle which is detected by the yaw-rate sensor 221. (Since the vehicle-behavior stabilization control is well known, further detailed explanations are not presented here.)

When the vehicle-behavior stabilization control unit 231 performs the vehicle-behavior stabilization control, the vehicle-behavior stabilization control unit 231 transmits a "drive instruction signal" to the motor control unit 243 in the brake control unit 241 in the initial stage of the operation of the vehicle-behavior stabilization control, and causes the motor control unit 243 to generate, by driving the motor 72, a predetermined hydraulic pressure in the slave cylinder 16 for generation of a predetermined braking force.

The yaw-moment control unit 201 includes a feedforward control unit 202 and a feedback control unit 203. The yaw-moment control unit 201 performs control for stabilizing the vehicle behavior in a manner different from the control performed by the vehicle-behavior stabilization control unit 231. Information on various physical quantities detected by various sensors is inputted into the feedforward control unit 202. The physical quantities include, for example, the steering angle (the amount of steering) and the steering speed of the vehicle which are detected by a steering-angle sensor 222, the lateral acceleration (the lateral G) of the vehicle which is detected by a lateral-acceleration sensor 223, the hydraulic pressure (oil pressure) in the master cylinder 34 which is detected by the pressure sensor Pm, and the vehicle speed which is detected by a speed sensor 224. On the basis of the above physical quantities, the feedforward control unit 202 feedforward controls the vehicle-behavior stabilization device 18, and resultantly performs yaw-moment control of the vehicle.

In addition, information on various physical quantities detected by various sensors is inputted into the feedback control unit 203. The above physical quantities include, for example, the steering angle (the amount of steering) and the steering speed of the vehicle which are detected by the steering-angle sensor 222, the lateral acceleration (the lateral G) of the vehicle which is detected by the lateral-acceleration sensor 223, the hydraulic pressure (oil pressure) in the master cylinder 34 which is detected by the pressure sensor Pm, the vehicle speed which is detected by the speed sensor 224, and the yaw rate of the vehicle which is detected by the yaw-rate sensor 221. On the basis of the above physical quantities, the feedback control unit 203 feedback controls the vehicle-behavior stabilization device 18, and resultantly performs yaw-moment control of the vehicle.

The control signals outputted from the feedforward control unit 202 and the feedback control unit 203 are summed and supplied to the vehicle-behavior stabilization driving device 251 (through the selection switch 252). Thus, the vehicle-behavior stabilization driving device 251 controls (the aforementioned various actuators, such as the motor M which drives the pump 136, in) the vehicle-behavior stabilization device 18.

The selection switch 252 selectively outputs to the vehicle-behavior stabilization driving device 251 the control signal from the yaw-moment control unit 201 or the vehicle-behavior stabilization control unit 231, on the basis of the steering speed of the vehicle which is detected by a steering-angle sensor 222, the yaw rate of the vehicle which is detected by the yaw-rate sensor 221, and other information.

When the feedforward control unit 202 and the feedback control unit 203 in the yaw-moment control unit 201 respectively perform the feedforward control and the feedback control, the feedforward control unit 202 and the feedback control unit 203 output to the motor control unit 243 in the brake control unit 241 a "drive forbid signal" for forbidding to drive the motor 72. (See the circled number "1" in FIG. 2.)

Figure 3:
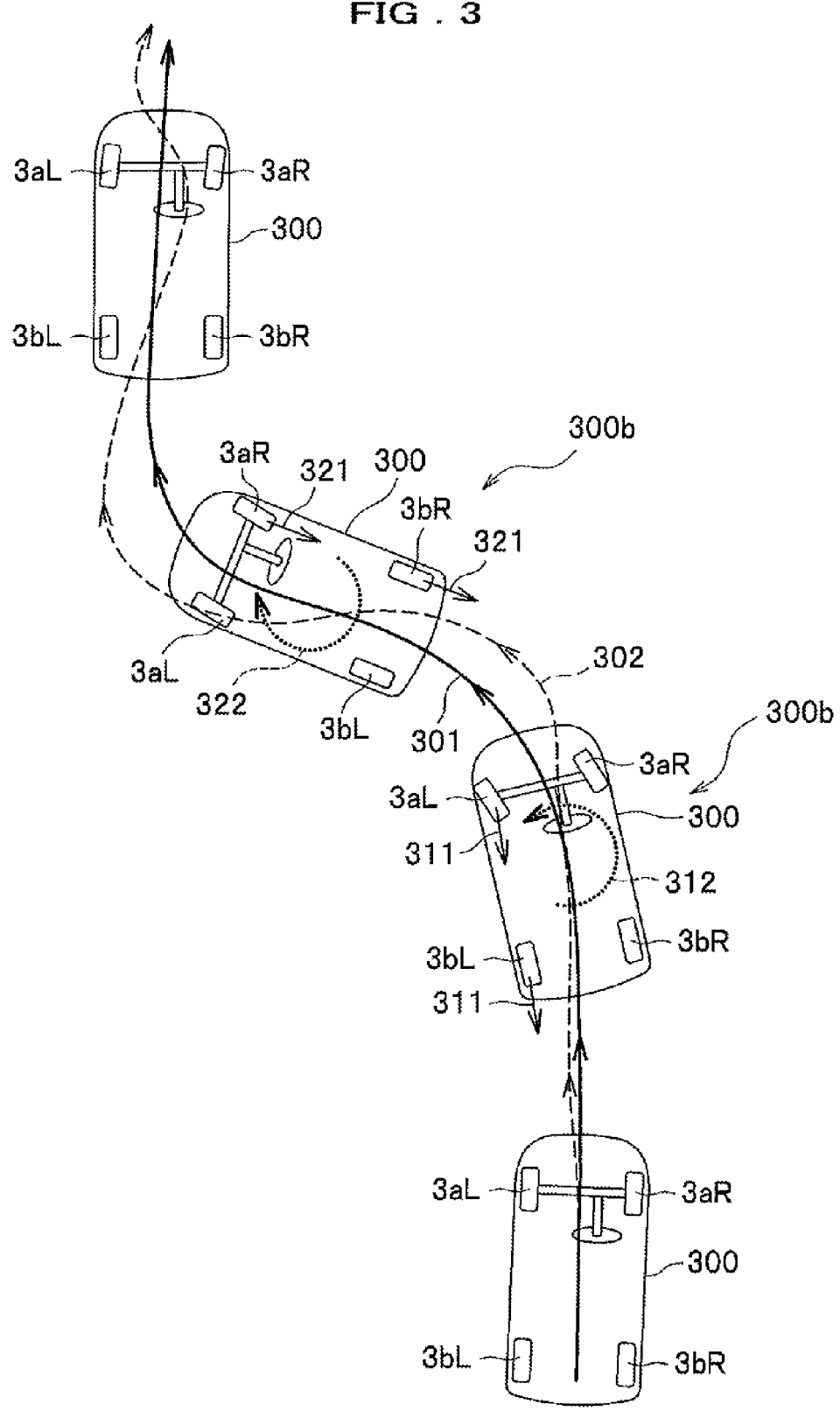
FIG. 3 is an explanatory drawing explaining details of the control performed by the yaw-moment control unit in the vehicle braking system as the embodiment of the present invention.

FIG. 3 is an explanatory drawing explaining details of the control performed by the yaw-moment control unit 201. In FIG. 3, travel curves of the vehicle 300, on which the vehicle braking system 10 is mounted, are indicated, and the travel curve which is the target of the driver of the vehicle 300 is indicated by the reference 301. In the illustrated example, the vehicle 300 is cornering. In addition, in FIG. 3, a travel curve of the vehicle 300 in the case where the control by the yaw-moment control unit 201 is not performed is indicated by the reference 302. Further, the control by the yaw-moment control unit 201 is not necessarily started on the precondition that the brake pedal 12 is depressed by the driver.

In other words, when the steering wheel is additionally turned left while the vehicle 300 (300a) is turning left, the yaw-moment control unit 201 controls the vehicle-behavior stabilization device 18 so to apply a light braking force to the front left wheel 3aL and the rear left wheel 3bL (as indicated by the arrows 311). Thus, a turning force (yaw moment) is exerted on the vehicle 300 as indicated by the arrow 312, so that the vehicle 300 can travel on the target travel curve 301, instead of the travel curve 302.

In addition, even when the turned steering wheel is returned while the vehicle 300 (300b) is turning right, the yaw-moment control unit 201 controls the vehicle-behavior stabilization device 18 so to apply a light braking force to the front right wheel 3aR and the rear right wheel 3bR (as indicated by the arrows 321). Thus, a turning force (yaw moment) is exerted on the vehicle 300 as indicated by the arrow 322, so that the vehicle 300 can travel on the target travel curve 301, instead of the travel curve 302.

The above yaw moment control enables the driver to realize a smooth vehicle behavior by a small manipulation of the steering wheel.

Next, the relationship between the control by the yaw-moment control unit 201 and the control by the vehicle-behavior stabilization control unit 231 is explained below. In the following explanations, the control for stabilizing the vehicle behavior by the yaw-moment control unit 201 is referred to as "yaw-moment control", and the control for stabilizing the vehicle behavior by the vehicle-behavior stabilization control unit 231 is referred to as "vehicle-behavior stabilization control".

Figure 4:
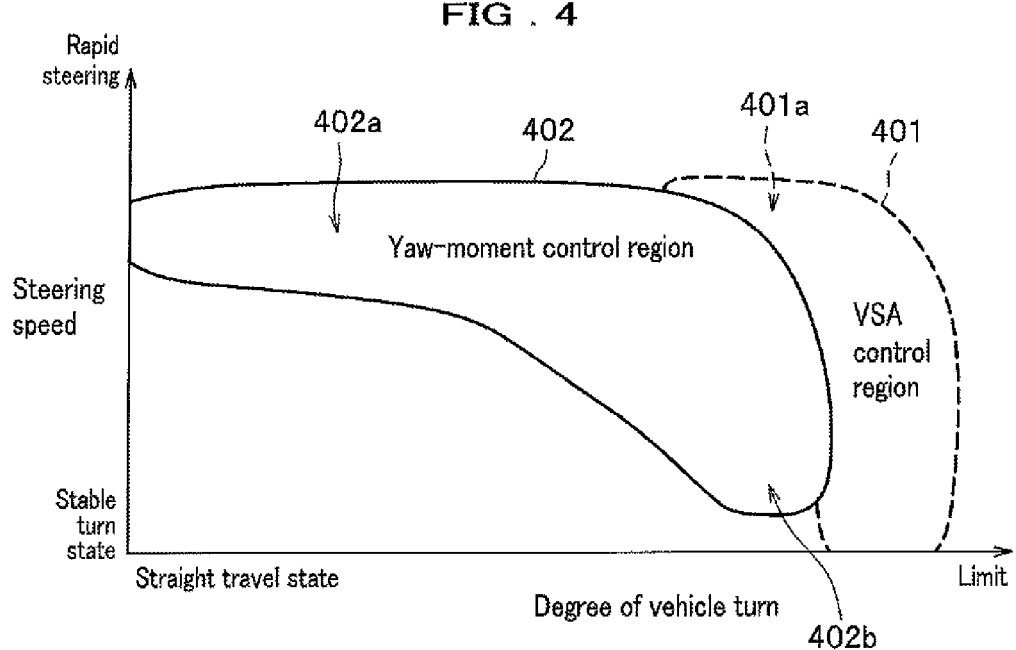
FIG. 4 is a graph presented for explaining the operational regions of yaw-moment control and vehicle-behavior stabilization control with respect to the degree of vehicle turn and the steering speed in the vehicle braking system as the embodiment of the present invention.

FIG. 4 is a graph presented for explaining the operational regions of the yaw-moment control and the vehicle-behavior stabilization control with respect to the degree of vehicle turn and the steering speed. The abscissa in FIG. 4 corresponds to the degree of vehicle turn (the degree of the turning speed), which is detected by the yaw-rate sensor 221 or the like. In FIG. 4, the left end of the graph corresponds to a straight travel state, and the degree of vehicle turn increases toward the right of the graph and reaches a limit at the right end of the graph. (The limit is such that the wheels are locked when the degree of vehicle turn exceeds the limit.) In addition, the ordinate in FIG. 4 corresponds to the steering speed, which is detected by the steering-angle sensor 222 or the like. In FIG. 4, the bottom end of the graph corresponds to a stable turn state of the vehicle, the steering speed increases toward the top of the graph, and the top end of the graph corresponds to rapid steering.

In FIG. 4, a vehicle-behavior stabilization control region, in which the vehicle-behavior stabilization control is performed by the vehicle-behavior stabilization control unit 231, is indicated by the reference 401, and a yaw-moment control region, in which the yaw-moment control is performed by the yaw-moment control unit 201, is indicated by the reference 402. As illustrated in FIG. 4, the vehicle-behavior stabilization control and the yaw-moment control operate in the different regions, the yaw moment control region being different from, and having no overlapping regions with the vehicle-behavior stabilization control region. Therefore, which of the vehicle-behavior stabilization control region 401 and the yaw-moment control region 402 the current state of the vehicle belongs to is determined, for example, on the basis of the values detected by the steering-angle sensor 222, the yaw-rate sensor 221, and the like, as mentioned before. Then, as indicated in FIG. 2, the selection switch 252 selectively outputs to the vehicle-behavior stabilization driving device 251 the control signals from the yaw-moment control unit 201 or the vehicle-behavior stabilization control unit 231 according to the determined region.

As illustrated in FIG. 4, the yaw-moment control region 402 extends from the straight travel state to a certain degree of vehicle turn in the case where the steering speed is rapid steering (corresponding to the region 402a). In this case, the feedforward control unit 202 performs the yaw-moment control. When the steering speed becomes closer to the aforementioned limit, the state of the vehicle comes into the yaw-moment control region 402 even when the steering speed is in the stable turn state (corresponding to the region 402b). In this case, the feedback control unit 203 performs the yaw-moment control.

In addition, the degree of vehicle turn reaches a degree very close to the aforementioned limit, the state of the vehicle comes into the vehicle-behavior stabilization control region 401 regardless of the steering speed. Further, even in the case where the degree of vehicle turn is slightly smaller than the degree very close to the aforementioned limit, the state of the vehicle comes into the vehicle-behavior stabilization control region 401 (corresponding to the region 401a) when the steering speed becomes rapid steering.

As explained above, although the state of the vehicle comes into the vehicle-behavior stabilization control region 401 when the degree of vehicle turn becomes close to the aforementioned limit, the state of the vehicle is in the yaw-moment control region 402 before the degree of vehicle turn becomes close to the aforementioned limit. In other words, when the degree of vehicle turn increases, the state of the vehicle first comes into the yaw-moment control region 402. Thereafter, when the degree of vehicle turn becomes close to the aforementioned limit, the state of the vehicle comes into the vehicle-behavior stabilization control region 401.

Therefore, when the degree of vehicle turn is relatively small (when the state of the vehicle is in the yaw-moment control region 402a), the phase delay in the steering can be reduced by the yaw-moment control realized by the feed-forward control. In addition, when the degree of vehicle turn is closer to the aforementioned limit (when the state of the vehicle is in the yaw-moment control region 402b), the phase delay in the steering can be reduced by the yaw-moment control realized by the feedback control.

Figure 5:
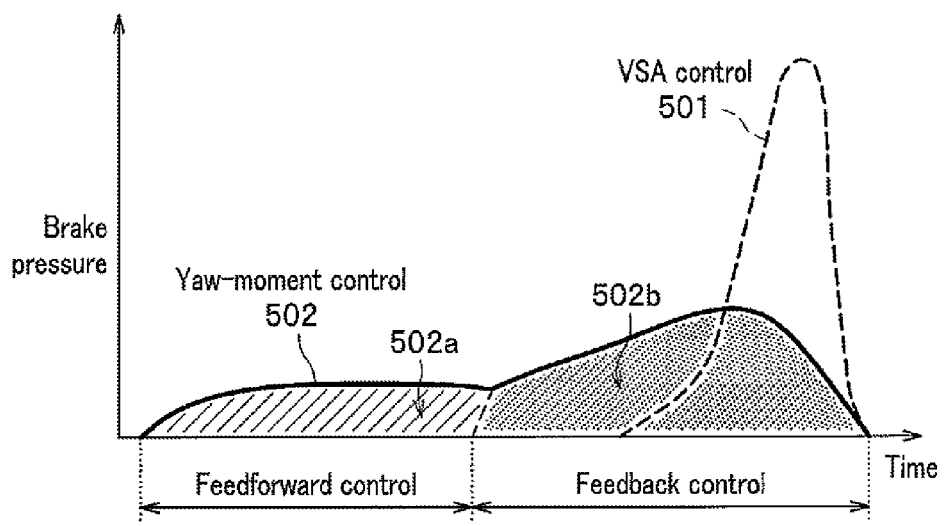
FIG. 5 is a graph presented for explaining the operational timings in the yaw-moment control and the vehicle-behavior stabilization control in the vehicle braking system as the embodiment of the present invention.

FIG. 5 is a graph presented for explaining the operational timings in the yaw-moment control and the vehicle-behavior stabilization control. In FIG. 5, the abscissa corresponds to the time course, and the ordinate corresponds to the braking force (the hydraulic brake pressure) generated by the vehicle-behavior stabilization device 18 for the yaw-moment control and the vehicle-behavior stabilization control. Specifically, the time along the abscissa indicates the time which elapses since detection of a symptom of instability in the vehicle behavior from the physical properties such as the yaw rate detected by the yaw-rate sensor 221. As clearly indicated in FIGS. 4 and 5, the control by the yaw-moment control unit 201 is started before the control by the vehicle-behavior stabilization control unit 231 is started.

As understood from FIG. 5, the feedforward control (indicated by the reference 502a) performed by the feedforward control unit 202, which is included in the yaw-moment control (indicated by the reference 502), first operates when a symptom of instability in the vehicle behavior is detected. Since the control which first operates is the feedforward control, the hydraulic brake pressure which is generated by the yaw-moment control realized by the feedforward control rises at first. After the elapse of a certain amount of time, the feedback control becomes able to operate, and the yaw-moment control is performed by the feedback control (indicated by the reference 502*b*), which is operated by the feedback control unit 203, However, whichever of the feedforward control and the feedback control operates, the hydraulic brake pressure generated by the yaw-moment control is relatively low.

In contrast, the vehicle-behavior stabilization control (indicated by the reference 501) which is performed by the vehicle-behavior stabilization control unit 231 generates greater brake pressure than the brake pressure generated by the yaw-moment control. However, the timing of the rise of the brake pressure generated by the vehicle-behavior stabilization control is delayed from the rise of the brake pressure generated by the yaw-moment control, which is realized by the feedforward control or the feedback control.

That is, the brake pressure generated by the yaw-moment control is set lower than the brake pressure generated by the vehicle-behavior stabilization control as indicated in FIG. 5.

Incidentally, in order to supplement the deficiency in the initial responsiveness of the brake pressure generated by the vehicle-behavior stabilization control, the vehicle-behavior stabilization control unit 231 performs the following control operations. That is, the vehicle-behavior stabilization control unit 231 sends the drive instruction signal to the motor control unit 243 in order to cause the motor control unit 243 to generate in the slave cylinder 16 a brake pressure (for prepressurization) as a predetermined level of hydraulic pressure, and adds the brake pressure generated in the slave cylinder 16, at an initial stage of the rising of the hydraulic brake pressure generated by the vehicle-behavior stabilization control. That is, the above control is intended to supplement the deficiency in the initial responsiveness of the brake pressure generated by the vehicle-behavior stabilization control with the initial responsiveness of the brake pressure in the slave cylinder 16.

On the other hand, as mentioned before, the yaw-moment control unit 201 starts the yaw-moment control, in which the braking force is applied by the feedforward control or the like, in advance of occurrence (or in an initial stage) of a disturbance in the vehicle behavior. As mentioned before, the brake pressure generated by the yaw-moment control is lower than the brake pressure generated by the vehicle-behavior stabilization control (as indicated in FIG. 5).

Therefore, in the case where the slave cylinder 16 is operated as mentioned before when the yaw-moment control is started, the accuracy of the yaw-moment control is lowered. That is, when a considerable amount of brake pressure generated in the slave cylinder 16 is added to the low brake pressure generated in the yaw-moment control, it is difficult to accurately control the brake pressure to be equal to a target brake pressure.

Figure 6:
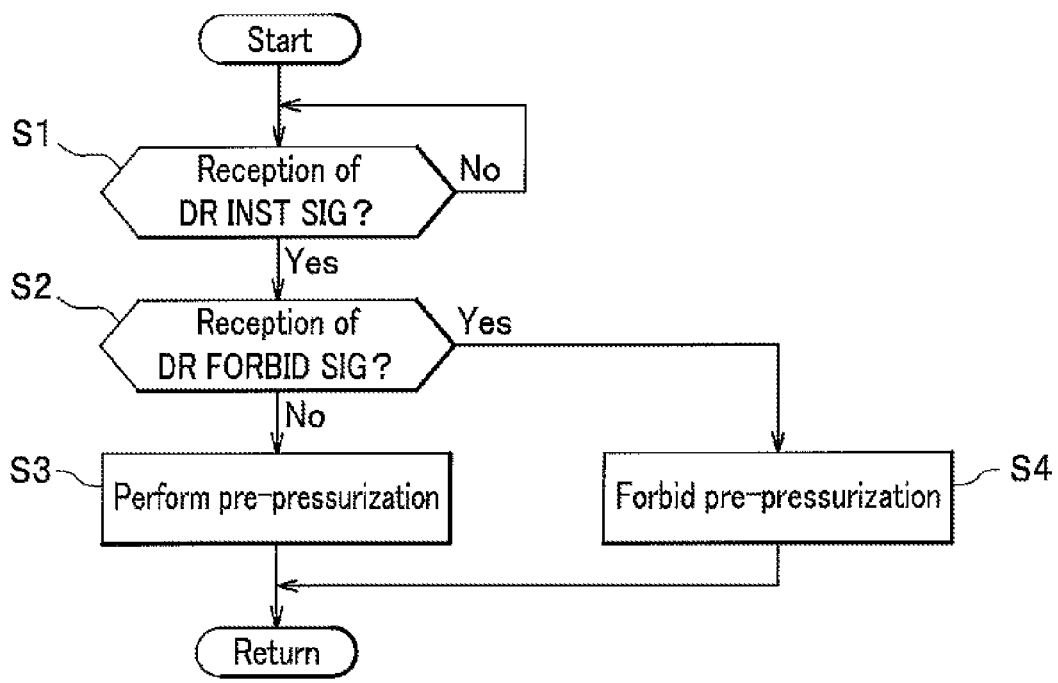
FIG. 6 is a flow diagram presented for explaining the control performed by the motor control unit in the vehicle braking system as the embodiment of the present invention.

Next, details of the control which is performed in the vehicle braking system 10 in order to solve the above problem are explained. FIG. 6 is a flow diagram presented for explaining the control performed by the motor control unit 243. Specifically, in the initial stage of the aforementioned vehicle-behavior stabilization control, the vehicle-behavior stabilization control unit 231 outputs to the motor control unit 243 the drive instruction signal for instructing the motor control unit 243 to generate the predetermined level of hydraulic pressure in the slave cylinder 16 for the prepressurization.

When the motor control unit 243 receives the above drive instruction signal from the vehicle-behavior stabilization control unit 231 (i.e., when Yes is determined in step S1), the motor control unit 243 determines whether or not the drive forbid signal is received from (the feedforward control unit 202 and/or the feedback control unit 203 in) the yaw-moment control unit 201 (in step S2). When the aforementioned yaw-moment control is performed in (the feedforward control unit 202 and/or the feedback control unit 203 in) the yaw-moment control unit 201, the motor control unit 243 receives the drive forbid signal.

When the motor control unit 243 does not receive the drive forbid signal (i.e., when No is determined in step S2), the motor control unit 243 performs the prepressurization by controlling the motor 72 to generate the predetermined level of brake pressure (in step S3). Therefore, the deficiency in the initial responsiveness of the brake pressure generated by the vehicle-behavior stabilization control can be supplemented by the prepressurization.

On the other hand, when the motor control unit 243 receives the drive forbid signal (i.e., when Yes is determined in step S2), the motor control unit 24 forbids the aforementioned prepressurization (in step S4). Therefore, the predetermined level of brake pressure in the slave cylinder 16 for the prepressurization becomes zero. Alternatively, in the above case, it is possible to generate a brake pressure in the slave cylinder 16 which is lower than the predetermined level in the original prepressurization, instead of forbidding the generation of the brake pressure (hydraulic pressure) in the slave cylinder 16 and bringing the brake pressure in the slave cylinder 16 to zero.

As explained above, when the aforementioned vehicle-behavior stabilization control is performed by the vehicle-behavior stabilization control unit 231 while the aforementioned yaw-moment control is performed by the yaw-moment control unit 201, the aforementioned prepressurization is not performed at all, or prepressurization is performed with the brake pressure lower than the predetermined level in the original prepressurization. Therefore, the low brake pressure generated by the yaw-moment control as explained before can be finely controlled.

LIST OF REFERENCE NUMERALS

10: Vehicle braking system
16: Slave Cylinder (Hydraulic-pressure Generation Device)
18: Vehicle-behavior Stabilization Apparatus
34: Master Cylinder
72: Motor (Electrical Actuator)
201: Yaw-moment Control Unit (Second Vehicle-behavior Stabilization Control Unit)
231: Vehicle-behavior Stabilization Control Unit (First Vehicle-behavior Stabilization Control Unit)
241: Brake Control Unit (Hydraulic-pressure Generation Control Unit)

What is claimed is:
1. A brake-by-wire vehicle braking system for a vehicle, said braking system comprising:
a hydraulic-pressure generation device comprising a slave cylinder operated by an electric motor, which communicates with a master cylinder and which is configured to generate a normal braking force with hydraulic pressure by operating the electric motor;

a vehicle-behavior stabilization device which communicates with the hydraulic-pressure generation device and which is configured to generate a first modified braking force for stabilizing a vehicle behavior;

a first vehicle-behavior stabilization control unit which is configured to perform a first control for stabilizing the vehicle behavior by controlling the vehicle-behavior stabilization device, the first control including pre-pressurization of said slave cylinder;

a hydraulic-pressure generation control unit which controls the hydraulic-pressure generation device so as to generate a target hydraulic pressure during the first control for stabilizing the vehicle behavior performed by the first vehicle-behavior stabilization control unit; and a second vehicle-behavior stabilization control unit which is configured to perform a second control for stabilizing the vehicle behavior by generating, at each of a plurality of wheels of the vehicle, a second modified braking force which is lower than the first modified braking force generated by the vehicle-behavior stabilization device under the first control of the first vehicle-behavior stabilization control unit;

wherein, during the second control for stabilizing the vehicle behavior performed by the second vehicle-behavior stabilization control unit, the hydraulic-pressure generation control unit either forbids generation of the target hydraulic pressure by the hydraulic-pressure generation device or reduces the target hydraulic pressure;

wherein the first vehicle behavior stabilization control unit is configured to determine whether the vehicle behavior corresponds to a first value set which is in a vehicle-behavior stabilization control region of a map stored in a memory of the vehicle braking system on the basis of sensed values of steering speed and steering angle, and if the first value set is in the vehicle-behavior stabilization control region, to perform the first control for stabilizing the vehicle behavior by controlling the vehicle-behavior stabilization device; and wherein the second vehicle-behavior stabilization control unit is configured to determine whether the vehicle behavior corresponds to a second value set which is in a yaw-moment control region of the map stored in the memory of the vehicle braking system, the yaw-moment control region being different from and having no overlapping regions with the vehicle-behavior stabilization control region, on the basis of the sensed values of steering speed and steering angle, and if the second value set is in the yaw-moment control region, to perform the second control for stabilizing the vehicle behavior by generating the second modified braking force.

2. The vehicle braking system according to claim 1, wherein the hydraulic-pressure generation control unit brings the target hydraulic pressure generated by the hydraulic-pressure generation device to zero during the second control for stabilizing the vehicle behavior performed by the second vehicle-behavior stabilization control unit.

3. The vehicle braking system as claimed in claim 1, wherein the second control performed by the second vehicle-behavior stabilization control unit comprises a feed-forward control.

4. A brake-by-wire vehicle braking system for a vehicle, said braking system comprising:

a plurality of sensors including a steering angle sensor and a yaw-rate sensor;

a hydraulic-pressure generation device comprising a slave cylinder operated by an electric motor, which communicates with a master cylinder and which is configured to generate a normal braking force with hydraulic pressure by operating the electric motor;

a vehicle-behavior stabilization device which communicates with the hydraulic-pressure generation device and which is configured to generate a first modified braking force for stabilizing a vehicle behavior;

a first vehicle-behavior stabilization control unit which is configured to selectively perform a first control for stabilizing the vehicle behavior by controlling the vehicle-behavior stabilization device, the first control including pre-pressurization of said slave cylinder, the first vehicle behavior stabilization control unit configured to determine whether the vehicle behavior corresponds to a first value set which is in a vehicle-behavior stabilization control region of a map stored in a memory of the vehicle braking system on the basis of sensed values of steering speed and steering angle, and if the first value set is in the vehicle-behavior stabilization control region, to perform the first control by controlling the vehicle-behavior stabilization device;

a hydraulic-pressure generation control unit which controls the hydraulic-pressure generation device so as to generate a target hydraulic pressure during the first control for stabilizing the vehicle behavior performed by the first vehicle-behavior stabilization control unit;

a second vehicle-behavior stabilization control unit which is configured to selectively perform a second control for stabilizing the vehicle behavior by generating, at each of a plurality of wheels of the vehicle, a second modified braking force which is lower than the first modified braking force generated by the vehicle-behavior stabilization device under the first control, the second vehicle-behavior stabilization control unit configured to determine whether the vehicle behavior corresponds to a second value set which is in a yaw-moment control region of the map stored in the memory of the vehicle braking system, the yaw moment control region being different from and having no overlapping regions with the vehicle-behavior stabilization control region, on the basis of the sensed values of steering speed and steering angle, and if the second value set is in the yaw moment control region, to perform the second control for stabilizing the vehicle behavior by generating the second modified braking force; and a selection switch for selecting either the first control unit or second control unit to stabilize the vehicle behavior, based on input received from said sensors;

wherein, during operation of the second control for stabilizing the vehicle behavior, the hydraulic-pressure generation control unit either forbids generation of the target hydraulic pressure by the hydraulic-pressure generation device or reduces the target hydraulic pressure.

* * * * *